United States Patent
Amano et al.

(10) Patent No.: US 10,690,180 B2
(45) Date of Patent: Jun. 23, 2020

(54) BALL BEARING AND MAIN SHAFT DEVICE FOR MACHINE TOOL

(71) Applicant: NSK LTD., Tokyo (JP)

(72) Inventors: Ryosuke Amano, Fujisawa (JP); Yoshiaki Katsuno, Fujisawa (JP); Kyohei Matsunaga, Fujisawa (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 16/322,313

(22) PCT Filed: Aug. 2, 2017

(86) PCT No.: PCT/JP2017/028092
§ 371 (c)(1),
(2) Date: Jan. 31, 2019

(87) PCT Pub. No.: WO2018/025922
PCT Pub. Date: Feb. 8, 2018

(65) Prior Publication Data
US 2019/0195276 A1 Jun. 27, 2019

(30) Foreign Application Priority Data
Aug. 3, 2016 (JP) .................. 2016-153245

(51) Int. Cl.
*F16C 19/16* (2006.01)
*F16C 33/58* (2006.01)
(Continued)

(52) U.S. Cl.
CPC .......... *F16C 19/16* (2013.01); *F16C 33/585* (2013.01); *F16C 33/6659* (2013.01);
(Continued)

(58) Field of Classification Search
CPC ...... F16C 19/16; F16C 19/163; F16C 33/585; F16C 33/586; F16C 33/782;
(Continued)

(56) References Cited

U.S. PATENT DOCUMENTS 3,195,965 A * 7/1965 Van Dorn ............. F16C 33/385
384/475
3,528,711 A * 9/1970 Atkinson ............ F16C 33/6681
384/465
(Continued)

FOREIGN PATENT DOCUMENTS

CN 202493577 U 10/2012
CN 202971589 U 6/2013
(Continued)

OTHER PUBLICATIONS

Communication dated Jul. 2, 2019, issued by the European Patent Office in counterpart European Application No. 17837024.3.
(Continued)

*Primary Examiner* — Marcus Charles
(74) *Attorney, Agent, or Firm* — Sughrue Mion, PLLC (57) ABSTRACT

When inner diameter side opening portions are projected on an outer circumferential surface of a retainer along extension lines of central lines of radial holes, at least parts of the inner diameter side opening portions of a plurality of radial holes of an outer ring are positioned within an area of two circles formed by connecting each of axial end portions of adjacent pockets of the retainer in an axial direction. When a central line of any one radial hole coincides with a circumferential phase of a center of a ball, any other radial hole is formed such that at least parts of the projected inner diameter side opening portion overlap with an inner circumferential surface of the pocket when viewed from a radial direction of a
(Continued)

ball bearing, and a central line of the other radial hole is separated from a circumferential phase of the center.

10 Claims, 9 Drawing Sheets

(51) Int. Cl.
*F16C 33/66* (2006.01)
*F16C 33/78* (2006.01)
(52) U.S. Cl.
CPC ........ *F16C 33/6662* (2013.01); *F16C 33/782* (2013.01); *F16C 19/163* (2013.01); *F16C 33/586* (2013.01); *F16C 2322/39* (2013.01)
(58) Field of Classification Search
CPC .............. F16C 33/6662; F16C 33/6659; F16C 2322/39; F16C 33/3887; F16C 33/664
USPC ................ 384/462, 466, 470, 475, 507, 516
See application file for complete search history.

(56) References Cited

U.S. PATENT DOCUMENTS

| | | | | |
|---|---|---|---|---|
| 4,384,749 | A * | 5/1983 | Schaefer | F16C 19/26 384/465 |
| 5,183,342 | A * | 2/1993 | Daiber | F01D 25/18 384/462 |
| 5,399,027 | A * | 3/1995 | Ijuin | F16C 33/6677 384/448 |
| 5,749,660 | A * | 5/1998 | Dusserre-Telmon | F16C 19/166 384/475 |
| 6,511,228 | B2 * | 1/2003 | Dusza | F16C 33/6651 384/475 |
| 6,869,223 | B2 * | 3/2005 | Azumi | B23Q 1/70 384/466 |
| 8,065,867 | B2 * | 11/2011 | McCutchan | F16C 19/163 384/499 |
| 8,292,511 | B2 * | 10/2012 | Gibbons | F16C 33/6651 384/462 |
| 9,453,535 | B2 * | 9/2016 | Krause | F16C 33/664 |
| 9,464,669 | B2 * | 10/2016 | Kerr | F16C 33/6677 |
| 2013/0202237 | A1 | 8/2013 | Kosugi | |

FOREIGN PATENT DOCUMENTS

| | | |
|---|---|---|
| CN | 204061556 U | 12/2014 |
| CN | 105605101 A | 5/2016 |
| DE | 10 2006 012 001 A1 | 9/2007 |
| DE | 10 2007 034 023 A1 | 1/2009 |
| DE | 10 2014 201 933 A1 | 8/2015 |
| JP | 60-59824 U | 4/1985 |
| JP | 11-264420 A | 9/1999 |
| JP | 2002-81441 A | 3/2002 |
| JP | 2008-151180 A | 7/2008 |
| JP | 2009-138897 A | 6/2009 |
| JP | 2009-180239 A | 8/2009 |
| JP | 2011-163465 A | 8/2011 |
| JP | 2012-7681 A | 1/2012 |
| JP | 2013-15152 A | 1/2013 |
| JP | 2013-79711 A | 5/2013 |
| JP | 5347538 B2 | 11/2013 |

OTHER PUBLICATIONS

International Search Report dated Aug. 29, 2017 by the International Searching Authority in counterpart International Patent Application No. PCT/JP2017/028092. (PCT/ISA/210).
Written Opinion dated Aug. 29, 2017 by the International Searching Authority in counterpart International Patent Application No. PCT/JP2017/028092 (PCT/ISA/237).
Communication dated Dec. 12, 2019, issued by the Chinese Patent Office in counterpart Chinese Application No. 201780048990.8.

* cited by examiner

BALL BEARING AND MAIN SHAFT DEVICE FOR MACHINE TOOL

CROSS REFERENCE TO RELATED APPLICATIONS

This application is a 371 of International Application No. PCT/JP2017/028092, filed on Aug. 2, 2017, which claims priority from Japanese Application No. 2016-153246, filed on Aug. 3, 2016. The entire disclosures of the prior applications are considered part of the disclosure of the accompanying continuation application, and are hereby incorporated by reference.

TECHNICAL FIELD

The invention relates to a ball bearing and a spindle device for a machine tool, and particularly to an outer ring oil-supply type ball bearing and a spindle device for a machine tool.

BACKGROUND ART

In recent years, in a spindle for a machine tool, a demand for high-speed operation increases for improvement of cutting efficiency. In addition, recently, in the spindle, for improvement of production efficiency, a need to correspond to a five-axis machining tool capable of machining a workpiece having a complicated shape without using a plurality of machine tools and without a changeover emerges. In the five-axis machining tool, the spindle or a table turns. Thus, shortening of axial length of the spindle is required due to demands for space saving by shortening of turning radius, power saving by inertia reduction in turning and weight reduction, or the like.

Grease lubrication, oil-air lubrication, oil-mist lubrication or the like is exemplified as a lubricating method which is widely adopted for a rolling bearing for the spindle for the machine tool. Generally, the oil-air lubrication is adopted in the area of high-speed rotation (dmn 800,000 or more). As oil-air lubrication of the related arts, there is known a system of supplying a high-pressure air and fine oil particles from a side surface of a bearing into the bearing by using an oil supplying nozzle piece 101 arranged on the side of a bearing 100 illustrated in FIG. 9A or the oil supplying nozzle piece 101 inserted into a radial through-hole 102a of an outer ring spacer 102 arranged on the side of the bearing 100 illustrated in FIG. 9B.

Figure 9A:
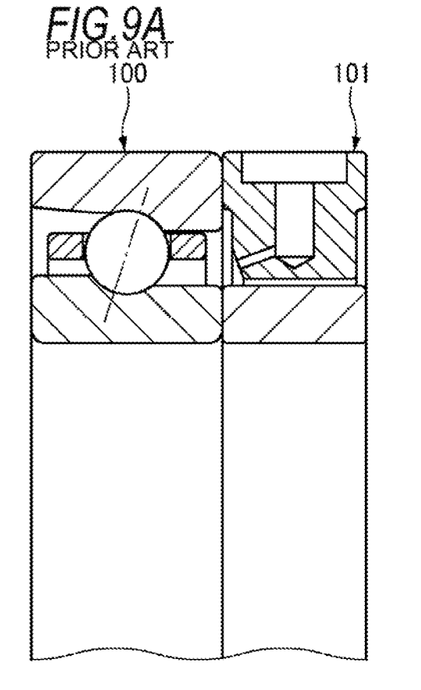
FIGS. 9A and 9B are a sectional view illustrating an oil-air lubrication of the related arts using a nozzle piece.
Figure 9B:
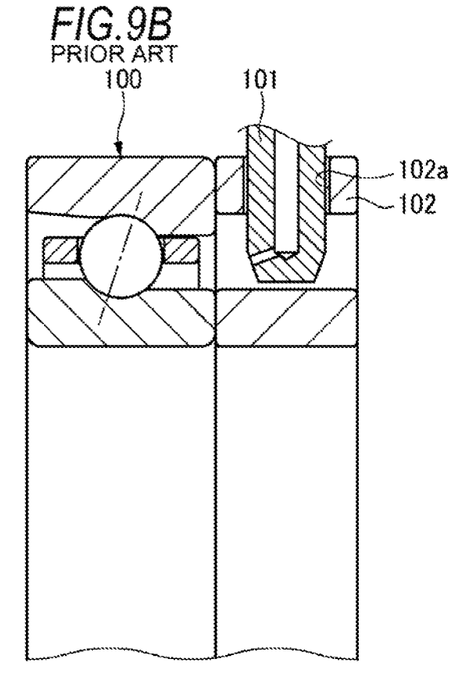

In this system, an oil supplying component such as the nozzle piece 101 is required additionally, and the number of spindles increases. This leads to an increase in cost of the entire spindle and effort for management. In addition, since the nozzle piece 101 is used, a shape of the outer ring spacer and a structure of a housing become complicated, and effort of designing and machining the spindle increases. Further, since the nozzle piece 101 is provided on the side surface of the bearing in the rotational axial direction, a certain degree of the spacer length is required, and the axial length of the spindle is elongated. Accordingly, size of the machine tool itself increases, weight of the spindle becomes heavier as the axial length increases, and a whirling speed (the whirling speed is a rotational speed calculated from a natural frequency of the spindle, and vibration becomes large when the spindle is rotated in this whirling speed range) of the spindle decreases. In addition, supply of oil particles from the oil supplying nozzle is hindered by an air curtain (the air curtain is a wall of high-speed air flow in the circumferential direction generated by friction between air and inner ring outer diameter surface rotating at high-speed) generated by high-speed rotation. As a result, it is hard to reliably supply lubricating oil into the bearing. As described above, although oil-air lubrication of the related arts is more excellent than the grease lubrication in terms of lubricity under high-speed rotation, as acceleration progresses, correspondence to the acceleration becomes important.

Figure 10:
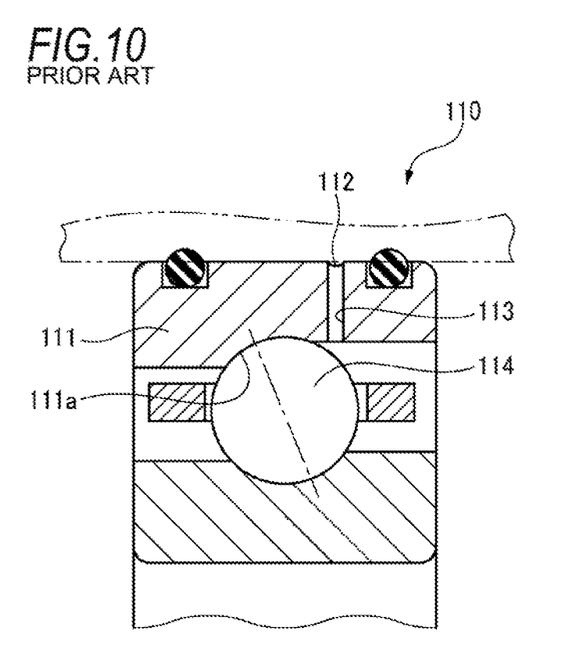
FIG. 10 is a sectional view of the ball bearing of the oil-air lubrication with an outer ring oil-supplying specification.

As another oil-air lubrication system, as illustrated in FIG. 10, there is known a system which uses an outer ring oil-supply type bearing 110 in which an oil groove 112 is formed on the outer circumferential surface of the outer ring 111 in the circumferential direction, and a plurality of oil holes 113 directed in a radial direction are formed at the same axial position as the oil groove 112 (for example, see Patent Document 1). In such an outer ring oil-supply type bearing, even when the bearing is used at high-speed rotation, the supply of the oil particles is not hindered by the air curtain. For this reason, it is possible to stably use the spindle even at high-speed rotation.

Figure 11:
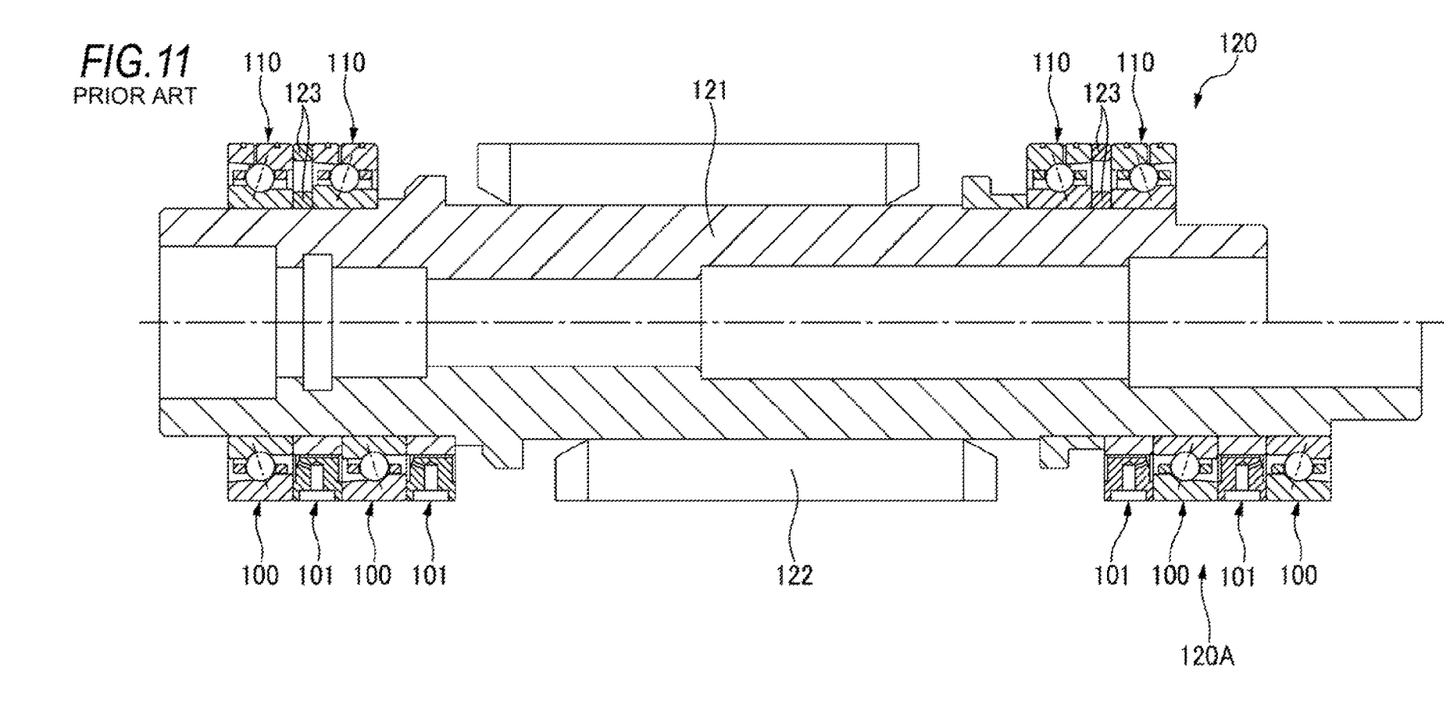
FIG. 11 is a sectional view in which the upper half is a spindle of the oil-air lubrication with the outer ring oil-supplying specification, and the lower half is a spindle of the oil-air lubrication using the nozzle piece.

FIG. 11 is a schematic view of the spindle in each case of the oil-air lubrication using the nozzle piece 101 and the oil-air lubrication with the outer ring oil-supplying specification. The upper half of FIG. 11 is a spindle 120 of the oil-air lubrication with the outer ring oil-supplying specification, and the lower half is a spindle 120A of the oil-air lubrication using the nozzle piece 101. Incidentally, in FIG. 11, reference sign 121 denotes a rotary shaft, and reference sign 122 denotes a rotor of a motor fitted to the rotary shaft 121. In this way, when the oil-air lubrication uses the nozzle piece 101, a spacer having a certain axial length or more is required to supply the lubricating oil from the side surface of the bearing 100. On the other hand, with the outer ring oil-supplying specification, an oil supplying spacer is not required. Thus, the nozzle piece can be reduced in size, and the structure of the spacer can be simplified, and the axial length of the spacer 123 can be shortened compared to the case of the specification using the nozzle piece. Accordingly, in the outer ring oil-supplying specification, it becomes simple to design and machine the spindle and the oil supplying component and manage the components, and the reduction of overall cost can be achieved in designing, manufacturing and managing of the machine tools. Additionally, the axial length can be shortened to reduce the size of the machine tool and improve the whirling speed of the spindle. As described above, the outer ring oil-supply type bearing has many advantages compared with a conventional side surface oil-supply type bearing.

PRIOR ART DOCUMENT

Patent Document

Patent Document 1: Japanese Unexamined Patent Application Publication No. 2013-79711

SUMMARY OF THE INVENTION

Problems to be Solved by the Invention

Incidentally, the ball bearing for the machine tool spindle is used under various conditions according to the specifications of the spindle. When the number of revolutions of the bearing or an initial preload and an external load during machining are different, an internal state (contact angle, size of contact ellipse of contact part between the inner ring groove and the ball or the outer ring groove and the ball, contact pressure, or the like) of the used bearing is different. For this reason, in the ball bearing to be used under various conditions, it is desirable to improve the lubricity of the bearing. Particularly, it is desirable that the lubricating state of the sliding contact part between the ball and the retainer is held excellently during the high-speed rotation.

The invention has been made in consideration of the above-described problems, and an object thereof is to provide a ball bearing which is provided in an outer ring of an outer ring oil-supply type bearing and in which excellent lubricity during high-speed rotation and low noise and low vibration can be achieved by properly setting axial positions and circumferential positions of a plurality of radial holes, and a spindle device for a machine tool.

Means for Solving the Problems

The above object of the invention is achieved with the following configuration.
(1) A ball bearing including:
an inner ring with an inner ring raceway groove on an outer circumferential surface;
an outer ring with an outer ring raceway groove on an inner circumferential surface;
a plurality of balls which are arranged in a rollable manner between the inner ring raceway groove and the outer ring raceway groove; and
a retainer with a plurality of pockets for retaining the plurality of respective balls, wherein
the outer ring includes a plurality of radial holes which penetrate from the outer circumferential surface to the inner circumferential surface in the radial direction to supply lubricating oil, such that the ball bearing is lubricated by the lubricating oil,
when inner diameter side opening portions of the plurality of radial holes are projected on an outer circumferential surface of the retainer along extension lines of central lines of the radial holes, at least parts of the projected inner diameter side opening portions are positioned within an area of two circles formed by connecting each of axial end portions of respective pockets of the retainer in a rotational axial direction of the ball bearing, and
when the central line of any one radial hole among the plurality of radial holes coincides with a circumferential phase of a center of the ball, any other radial hole is formed such that when the inner diameter side opening portion of the radial hole is projected on the outer circumferential surface of the retainer along the extension line of the central line of the radial hole, at least parts of the projected inner diameter side opening portion overlap with an inner circumferential surface of the pockets when viewed from a radial direction of the ball bearing, and the central line of the other radial hole is separated from the circumferential phase of the center of the ball.
(2) The ball bearing according to (1), wherein
a concave groove communicating with the radial hole is formed along a circumferential direction in an outer circumferential surface of the outer ring.
(3) The ball bearing according to (2), wherein
in the outer circumferential surface of the outer ring, annular grooves are formed on both axial sides sandwiching the concave groove along the circumferential direction, and annular seal members are respectively arranged in each of the annular grooves.
(4) The ball bearing according to any one of (1) to (3), wherein
a diameter of the radial hole is 0.5 to 1.5 mm.

(5) The ball bearing according to any one of (1) to (4), wherein
in the radial hole, an opening area of the inner diameter side opening portion is larger than an opening area of the outer diameter side opening portion.
(6) A spindle device for a machine tool including:
the ball bearing according to any one of (1) to (5).

Effect of the Invention

According to the ball bearing of the invention, the outer ring includes the plurality of radial holes which penetrate from the outer circumferential surface to the inner circumferential surface in the radial direction to supply the lubricating oil. When the inner diameter side opening portions of the plurality of radial holes are projected on the outer circumferential surface of the retainer along the extension line of the central lines of the radial holes, at least parts of the projected inner diameter side opening portions are positioned within the area of two circles formed by connecting the axial end portions of the pockets of the retainer in the rotational axial direction of the ball bearing. When the central line of any one radial hole among the plurality of radial holes coincide with the circumferential phase of the center of the ball, any other radial hole is formed such that when the inner diameter side opening portion of the radial hole is projected on the outer circumferential surface of the retainer along the extension line of the central line of the radial hole, at least parts of the projected inner diameter side opening portion overlap with the inner circumferential surface of the pocket when viewed from the radial direction of the ball bearing. The central line of the other radial hole is separated from the circumferential phase of the center of the ball. Accordingly, sufficient lubricating oil is supplied to the sliding contact part between the ball and the retainer, so that excellent lubricating state can be maintained to prevent seizure of the bearing. The noise and the vibration can be reduced without completely interrupting the flow of the compressed air.

BRIEF DESCRIPTION OF DRAWINGS

FIGS. 3A and 3B are views for explaining a target position of another radial hole when a ball and a retainer are viewed from an outer diameter side, wherein
FIG. 3A illustrates an area where the inner diameter side opening portion of the another radial hole can be arranged when the central line of the another radial hole is positioned outside the inner circumferential surface of the pocket,
and FIG. 3B illustrates an area where the inner diameter side opening portion of the another radial hole can be arranged when the central line of the another radial hole is positioned inside the inner circumferential surface of the pocket.

DESCRIPTION OF EMBODIMENTS

Hereinafter, a ball bearing and a spindle device for a machine tool according to one embodiment of the invention will be described in detail based on the drawings.

Figure 1:
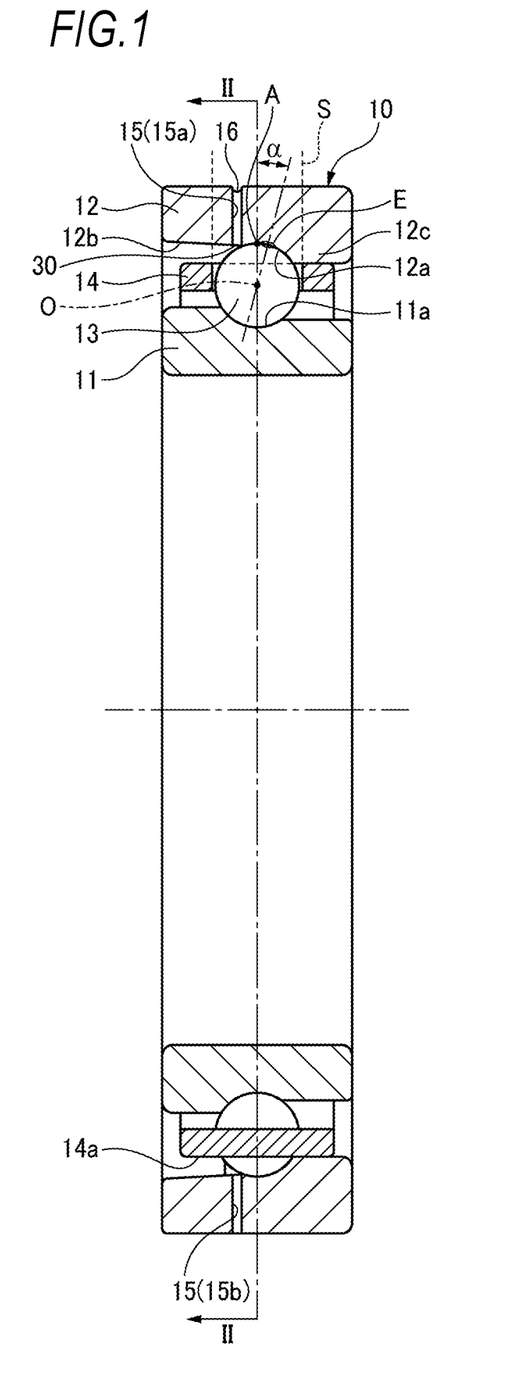
FIG. 1 is a sectional view of a ball bearing according to one embodiment of the invention.

As illustrated in FIG. 1, an angular ball bearing 10 according to the present embodiment is applicable to a spindle device for a machine tool and includes an inner ring 11 with an arc-shaped inner ring raceway groove 11a on the outer circumferential surface, an outer ring 12 with an arc-shaped outer ring raceway groove 12a on the inner circumferential surface, a plurality of balls 13 which are arranged with a predetermined contact angle α in a rollable manner between the inner ring raceway groove 11a and the outer ring raceway groove 12a, and an outer ring guide type retainer 14 with a cylindrical pocket P for retaining the plurality of balls 13. A counter bore 12b with an inclined part of which the diameter reduces gradually from the axial end surface to the outer ring raceway groove 12a is provided on one inner circumferential surface of the outer ring 12 in the axial direction, and a groove shoulder 12c having a uniform inner diameter is formed on the other inner circumferential surface in the axial direction. In the present embodiment, the outer circumferential surface 14a of the retainer 14 is formed to have a uniform outer diameter in the axial direction.

The angular ball bearing 10 is an outer ring oil-supply type bearing, and the outer ring 12 includes a plurality of radial holes 15 (15a, 15b) which penetrate from the outer circumferential surface to the inner circumferential surface in the radial direction to supply lubricating oil. A concave groove 16 which communicates with the plurality of radial holes 15 is formed on the outer circumferential surface of the outer ring 12 along the circumferential direction. Accordingly, in the angular ball bearing 10, oil particles and lubricating air which are supplied from an oil supply passage of a housing (not illustrated) are directly supplied to the ball 13 through the concave groove 16 and the radial hole 15 of the outer ring 12, and oil-air lubrication is performed.

Incidentally, instead of being provided in the outer ring 12, the circumferential concave groove may be formed at the position of the oil supply passage opening communicating with the radial hole 15 in the inner circumferential surface of the housing.

In this way, the plurality of radial holes 15 are provided so that the lubricating oil can uniformly spread over the entire raceway surface without unevenness, and the reliability of the lubrication during the high-speed rotation can be improved.

The outer ring 12 is well cooled in a phase close to the radial hole 15, and the cooling is weak in the phase far from the radial hole 15. Thus, a temperature difference is generated by the phase of the outer ring 12 to affect the dimensional accuracy of the bearing. For this reason, the plurality of radial holes 15 are provided so that the temperature fluctuation of the outer ring 12 of the bearing can be prevented.

Figure 2:
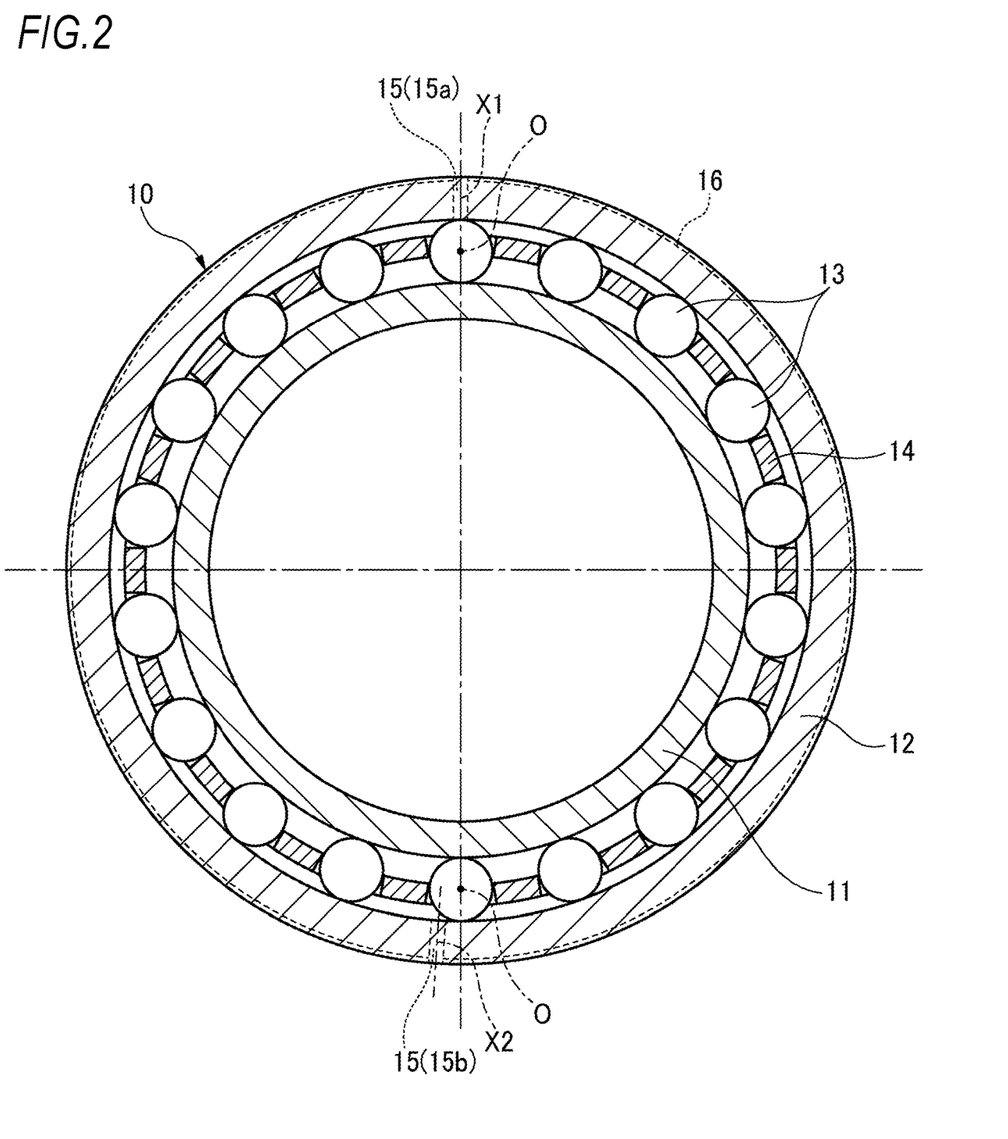
FIG. 2 is a sectional view of the ball bearing as seen along line II-II of FIG. 1.

As illustrated in FIG. 2, in the present embodiment, when the inner diameter side opening portions 30 of the plurality of radial holes 15 are projected on the outer circumferential surface of the retainer 14 along the extension lines of the central lines X1 and X2 of the radial holes 15, at least parts of the projected inner diameter side opening portion 30 are positioned within the area (in a dotted line S illustrated in FIG. 1) of two circles L (see FIGS. 3A and 3B) formed by connecting each of the axial end portions of the respective pockets P of the retainer 14 in the rotational axial direction of the ball bearing 10.

Generally, the sliding contact part (the inner surface of the pocket P of the retainer 14) between the ball 13 and the retainer 14 is in a bad lubricating state. Particularly, in the bearing for the machine tool spindle, to avoid the temperature increase and the temperature fluctuation of the bearing, the amount of the lubricating oil supplied to the bearing is extremely small. Under such conditions, sufficient lubricating oil is hardly supplied to the sliding contact part between the ball 13 and the retainer 14, and seizure may occur due to lubrication failure of the sliding contact part between the ball 13 and the retainer 14.

Therefore, it is desirable that the lubricating oil is supplied to the outer ring oil-supply type bearing such that the lubricating state of the sliding contact part between the ball 13 and the retainer 14 is maintained excellently. For this reason, when the inner diameter side opening portions 30 of the radial holes 15 are projected on the outer circumferential surface of the retainer 14 along the extension lines of the central lines X1 and X2 of the radial holes 15, the projected inner diameter side opening portions 30 are positioned within the area of two circles L formed by connecting each of the axial end portions of the respective pockets P of the retainer 14 in the rotational axial direction of the ball bearing 10. Thus, sufficient lubricating oil is supplied to the sliding contact part between the ball 13 and the retainer 14 to maintain excellent lubricating state and prevent seizure of the bearing.

If the inner diameter side opening portions 30 of the above-described projected radial holes 15 are outside the above-described area of the two circles, vibration and noise increase as well as lubrication failure occurs in the sliding contact part between the ball 13 and the retainer 14. Specifically, pressure of compressed air acts on a point separated from the axial central position of the retainer 14 to generate a couple of force to incline the posture of the retainer 14. Desirably, the retainer 14 in the bearing during the rotation is typically rotated in the same posture. However, the posture of the retainer 14 is changed with time by the couple of force, and the vibration or the noise caused by the movement of the retainer 14 increases.

Figure 4A:
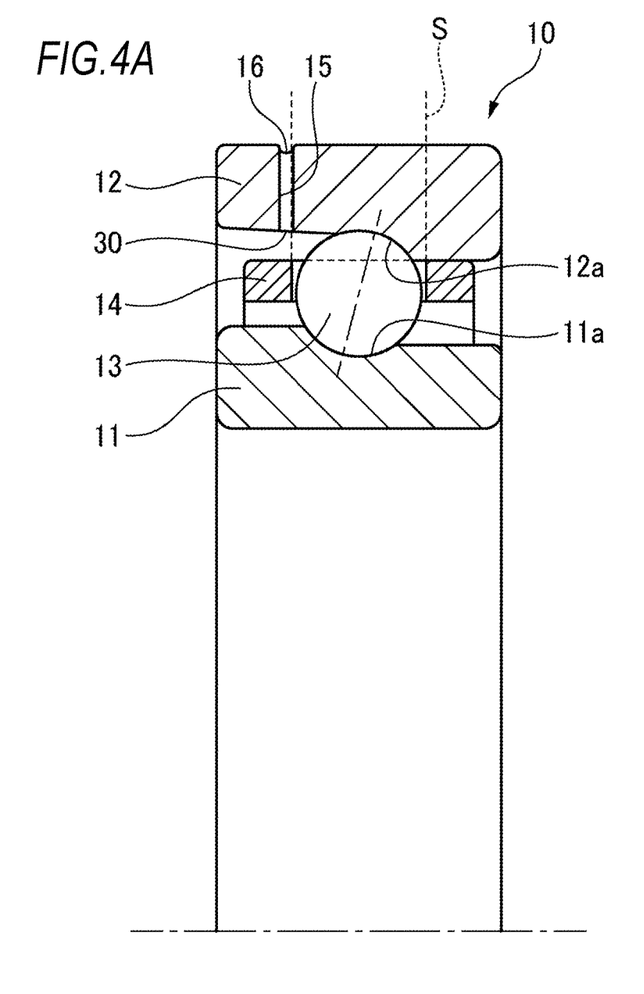
FIG. 4A is a sectional view of the ball bearing illustrating the axial outermost position of the radial hole on a counter bore side.
Figure 4B:
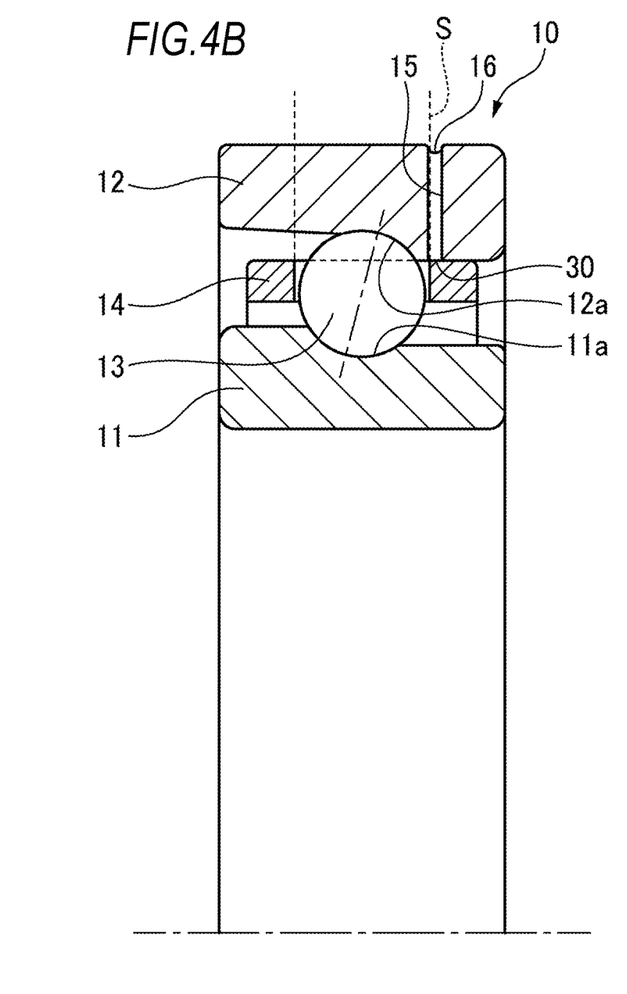
FIG. 4B is a sectional view of the ball bearing illustrating the axial outermost position of the radial hole on a side opposite to the counter bore side.

In the present embodiment, at least parts of the projected inner diameter side opening portions 30 of the plurality of radial holes 15 may be positioned within the area (in the dotted line S of FIGS. 4A and 4B) of two circles L formed by connecting each of the axial end portions of the respective pockets P of the retainer 14 in the rotational axial direction of the ball bearing 10. That is, as illustrated in FIG. 4A, at least parts of the projected inner diameter side opening portions 30 of the plurality of radial holes 15 may overlap with a circle L on the counter bore side formed by connecting each of the axial end portions of the respective pockets P of the retainer 14 in the rotational axial direction of the ball bearing 10. Alternatively, as illustrated in FIG. 4B, at least parts of the projected inner diameter side opening portions 30 of the plurality of radial holes 15 may overlap with a circle L on a side opposite to the counter bore side formed by connecting each of the axial end portions of the respective pockets P of the retainer 14 in the rotational axial direction of the ball bearing 10.

When at least parts of the inner diameter side opening portions 30 of the radial hole 15 are positioned within the outer ring raceway groove 12a, the inner diameter side opening portions 30 of the radial hole 15 are preferably formed at the contact point between the outer ring raceway groove 12a and the ball 13 when a preload or an external load is applied to the bearing or when the position which does not interfere with a contact ellipse E. When the radial hole 15 is formed as described above, stress concentration caused by contact between the edge portion of the radial hole 15 and the ball 13 can be prevented, and separation of the ball 13 or the outer ring raceway groove 12a can be prevented. Incidentally, the contact ellipse E is contact ellipse generated only by the initial preload, and more preferably, the contact ellipse is contact ellipse generated by the bearing internal load including the external load generated during machining the workpiece.

Figure 3A:
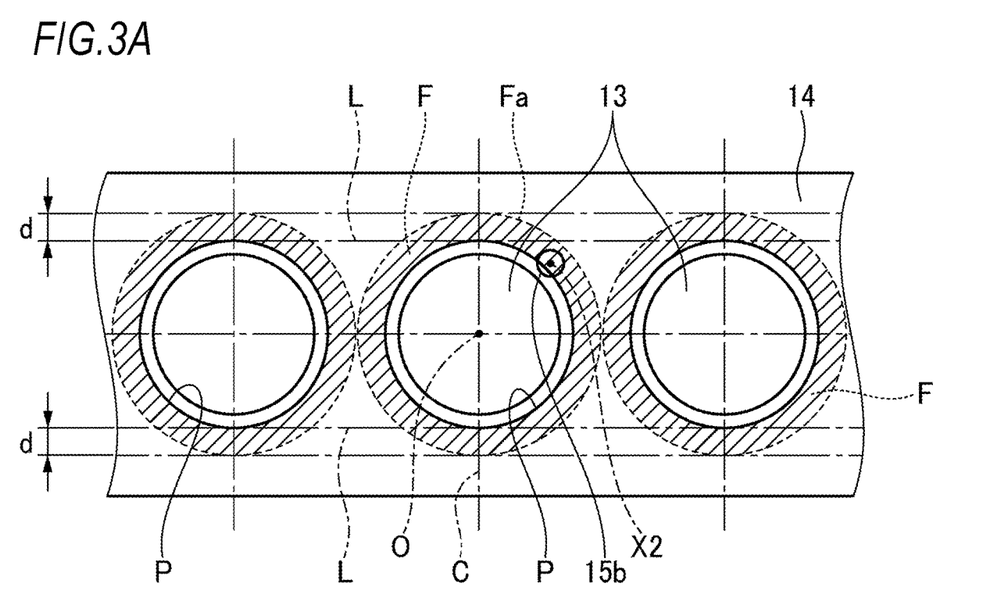
Figure 3B:
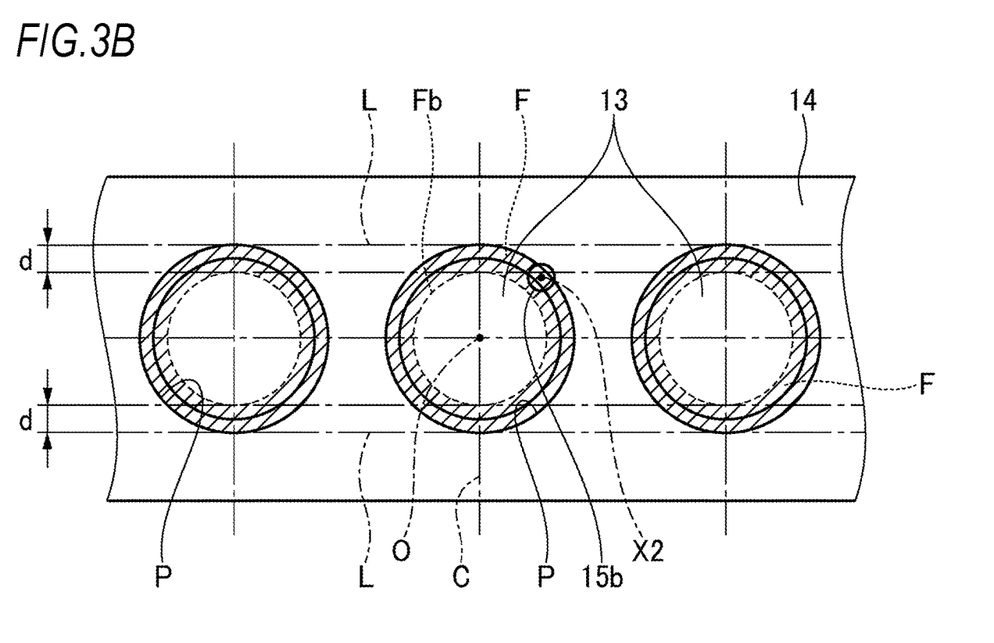

With reference to FIGS. 2, 3A and 3B, when the central line X1 of any one radial hole 15a among the plurality of radial holes 15a and 15b coincide with the circumferential phase of the center O of the ball 13, any other radial hole 15b is formed such that when the inner diameter side opening portion 30 of the radial hole 15b is projected on the outer circumferential surface of the retainer 14 along the extension line of the central line X2 of the radial hole 15b, at least parts of the projected inner diameter side opening portion 30 overlap with the inner circumferential surface of the pocket P when viewed from the radial direction of the ball bearing 10. When the central line X1 of any one radial hole 15a coincides with the circumferential phase of the center O of the ball 13, the central line X2 of any other radial hole 15b is separated from the circumferential phase of the center O of the ball 13.

FIG. 3A illustrates an area F in which at least parts of the projected inner diameter side opening portion 30 of the radial hole 15b can be arranged when the central line X2 of the other radial hole 15b is positioned outside the inner circumferential surface of the pocket P. In this case, the projected inner diameter side opening portion 30 of the radial hole 15b is positioned on the inner side than an outer circle Fa defining the area F, and further the central line X2 of the other radial hole 15b does not coincide with a line C passing through the center O of the ball 13 as described above.

FIG. 3B illustrates the area F in which at least parts of the extension line of the projected inner diameter side opening portion 30 of the radial hole 15b can be arranged when the central line X2 of the other radial hole 15b is positioned inside the inner circumferential surface of the pocket P. In this case, the projected inner diameter side opening portion 30 of the radial hole 15b is positioned on the outer side than an inner circle Fb defining the area F, and further the central line X2 of the other radial hole 15b does not coincide with the line C passing through the center O of the ball 13 as described above. Incidentally, in FIGS. 3A and 3B, "d" indicates a hole diameter of the radial hole 15b.

Accordingly, when any one radial hole 15a is closed by the ball 13, oil is supplied through the other radial hole 15b toward the opening portion (pocket gap portion) between the ball 13 and the inner circumferential surface of the pocket P, so that the oil can be reliably supplied to the sliding contact part between the ball 13 and the inner circumferential surface of the pocket P, and the lubrication during rotation (particularly, during high-speed rotation) is performed reliably.

A part of the lubricating oil passing through a gap between the ball 13 and the inner circumferential surface of the pocket P can adhere to the surface of the inner ring raceway groove 11a to be supplied to the rolling contact part between the inner ring raceway groove 11a and the ball 13. In high-speed rotation, the lubricating oil is easily biased toward the outer ring raceway groove 12a by a centrifugal force action, and the lubricating oil on the inner ring side becomes insufficient. In the present embodiment, an ideal oil supply form is made such that the lubricating oil moves to the outer ring raceway groove 12a by the adhesion of the inner ring raceway groove 11a to the surface of the ball 13, the lubrication of the rolling contact part between the outer ring raceway groove 12a and the ball 13 is performed, and then the lubricating oil is discharged outside the bearing.

In the outer ring oil supply system, when the radial hole 15 is present in the outer ring raceway groove 12a, and the ball 13 passes on the radial hole 15 during bearing rotation, the radial hole 15 is closed physically. Accordingly, vibration and noise are generated. This vibration is air vibration generated by periodically repeating a phenomenon in which (i) the radial hole 15 is closed when the ball 13 passes just on the radial hole 15 to block the flow of the compressed air, and then (ii) the flow restarts after the ball 13 passes just on the radial hole 15.

The air vibration tends to become larger as the number of the balls 13 passing on the radial holes 15 once increases, and when the vibration increases, the noise increases, and the machining accuracy of the spindle is deteriorated.

Particularly, the noise is known to be a notable problem. In the area where the outer ring oil-supply type bearing is used mainly, and the number of revolutions is 10000 min' or more, a problem easily occurs in which the frequency of the generated noise is about several thousand Hz, and the noise of the frequency band in which the sensitivity of the human ears is the highest is generated.

When the plurality of radial holes 15 are closed simultaneously by the balls 13, the supply amount of the lubricating oil while passing is reduced remarkably. After the balls 13 pass, the lubricating oil stored in the radial hole 15 is supplied at once. Stirring resistance of the lubricating oil increases due to instantaneous excessive supply of the lubricating oil, and thus temperature of the bearing outer ring rises remarkably. Accordingly, machining accuracy is deteriorated, or risk of seizure due to abnormal temperature rise increases.

For this reason, it is desirable that the balls 13 do not pass on the plurality of radial holes 15 simultaneously during bearing rotation. Therefore, when the central line X1 of any one radial hole 15a coincides with the circumferential phase of the center O of the ball 13, the central line X2 of any other radial hole 15b is separated from the circumferential phase of the center O of the ball 13. That is, when any one radial hole 15a is closed by the ball 13, the other radial hole 15b opens so that the flow of the compressed air is not completely blocked, and noise and vibration can be reduced.

Incidentally, when the outer ring 12 includes three or more radial holes 15 and the central line X1 of any one radial hole 15a coincides with the circumferential phase of the center O of the ball 13, more desirably, all of the remaining other radial holes 15b are positioned in the area F.

In the present embodiment, considering the supply of the lubricating oil and prevention of interference with the contact ellipse E, the diameter of the radial hole 15 is set to 0.5 to 1.5 mm. In the present embodiment, the radial hole 15 has a uniform diameter over the radial direction.

In a bearing device 1 configured in this way, the outer ring 12 includes the plurality of radial holes 15 which penetrate from the outer circumferential surface to the inner circumferential surface in the radial direction to supply the lubricating oil. Further, when the inner diameter side opening portions 30 of the plurality of radial holes 15 are projected on the outer circumferential surface of the retainer 14 along the extension line of the central lines X1 and X2 of the radial holes 15, at least parts of the projected inner diameter side opening portions 30 are positioned within the area of two circles L formed by connecting each of the axial end portions of the respective pockets P of the retainer 14 in the rotational axial direction of the ball bearing 10. When the central line X1 of any one radial hole 15a among the plurality of radial holes 15 coincide with the circumferential phase of the center O of the ball 13, any other radial hole 15b is formed such that when the inner diameter side opening portion 30 of the radial hole 15b is projected on the outer circumferential surface of the retainer 14 along the extension line of the central line X2 of the radial hole 15b, at least parts of the projected inner diameter side opening portion 30 overlap with the inner circumferential surface of the pocket P when viewed from the radial direction of the ball bearing 10. The central line X2 of the other radial hole 15b is separated from the circumferential phase of the center O of the ball 13. Accordingly, sufficient lubricating oil is supplied to the sliding contact part between the ball 13 and the retainer 14, so that excellent lubricating state can be maintained to prevent seizure of the bearing. Noise and vibration can be reduced without completely interrupting the flow of the compressed air.

Figure 5:
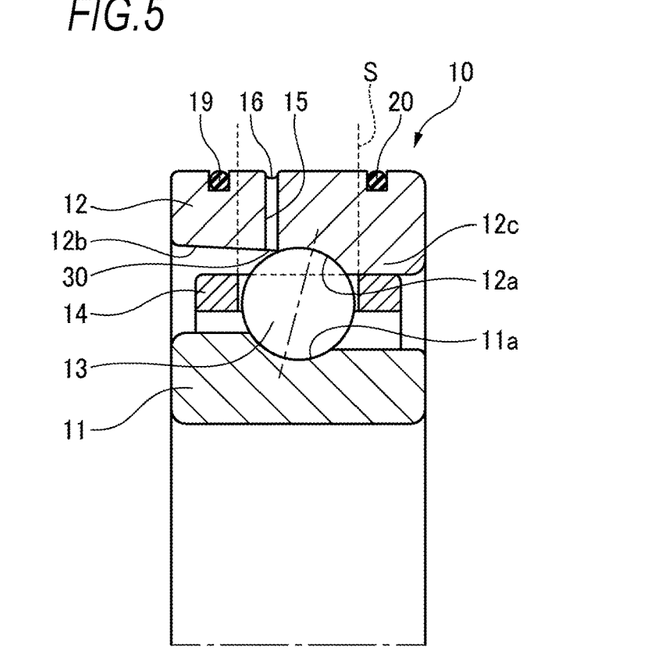
FIG. 5 is a sectional view of a ball bearing according to a first modification of the present embodiment.

In the present embodiment, as in a first modification illustrated in FIG. 5, in the outer circumferential surface of the outer ring 12, annular grooves 19 may be formed on both axial sides sandwiching the concave groove 16 along the circumferential direction, and a seal member 20 which is an annular elastic member such as an O ring may be arranged in each of the annular grooves 19, thereby preventing oil leakage.

Figure 6:
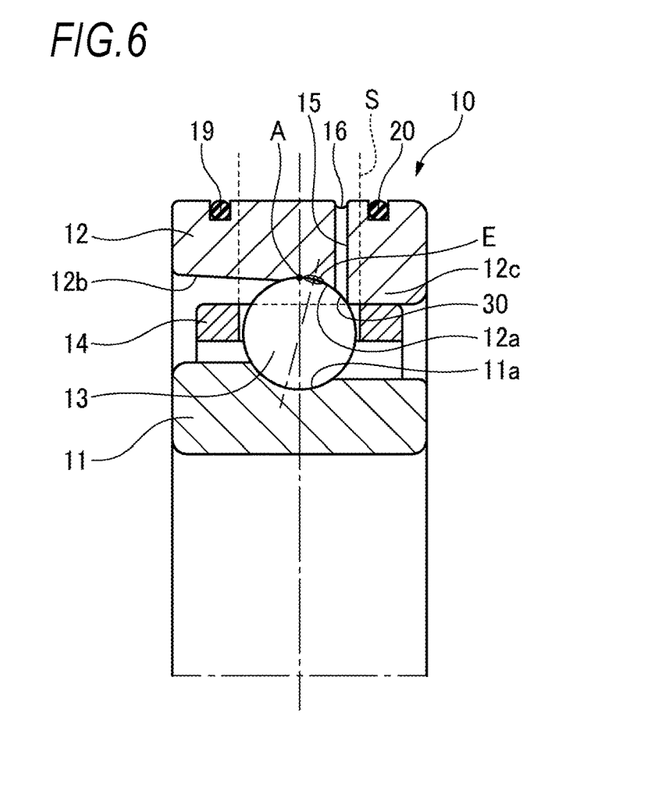
FIG. 6 is a sectional view of a ball bearing according to a second modification of the present embodiment.

In the present embodiment, the projected inner diameter side opening portions 30 of the radial holes 15 may be within the range illustrated in an area S of FIG. 1. In FIG. 1, the inner diameter side opening portion 30 is formed on the counter bore side regarding a groove bottom A of the outer ring raceway groove 12a. As in a second modification illustrated in FIG. 6, the inner diameter side opening portion 30 may be formed on a side opposite to the counter bore side regarding the groove bottom A of the outer ring raceway groove 12a. Any one radial hole 15 may be formed on the counter bore side regarding the groove bottom A of the outer ring raceway groove 12a, and any other radial hole 15 may be formed on a side opposite to the counter bore side regarding the groove bottom A of the outer ring raceway groove 12a.

Figure 7:
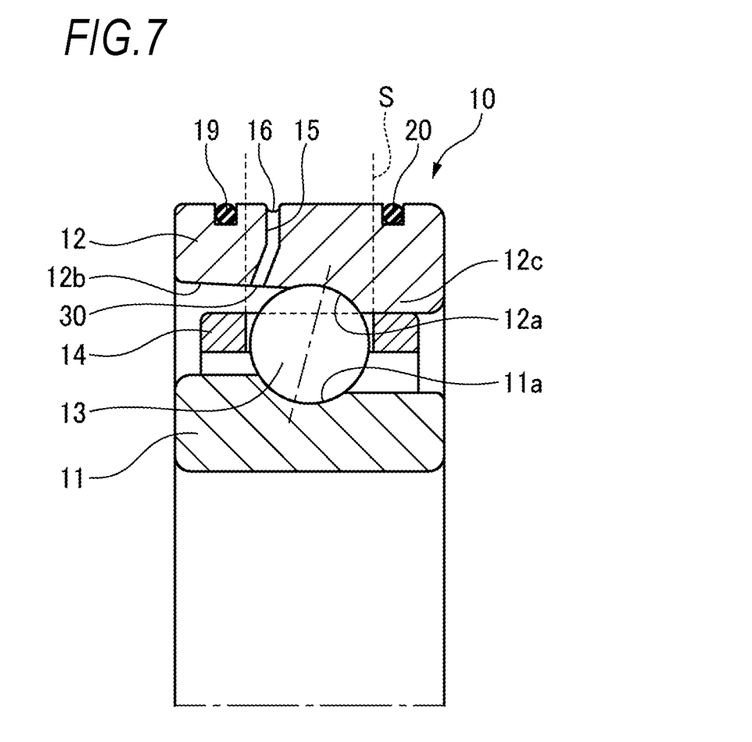
FIG. 7 is a sectional view of a ball bearing according to a third modification of the present embodiment.

The radial hole 15 may penetrate from the outer circumferential surface of the outer ring to the inner circumferential surface in the radial direction. The radial hole may be formed along the radial direction (parallel to a radial sectional plane) of the present embodiment or may be formed to be inclined in the rotational axial direction or the circumferential direction of the bearing. For example, as in a third modification illustrated in FIG. 7, the radial hole 15 may be formed to be bent in the axial direction in the middle of the radial direction of the bearing.

Figure 8A:
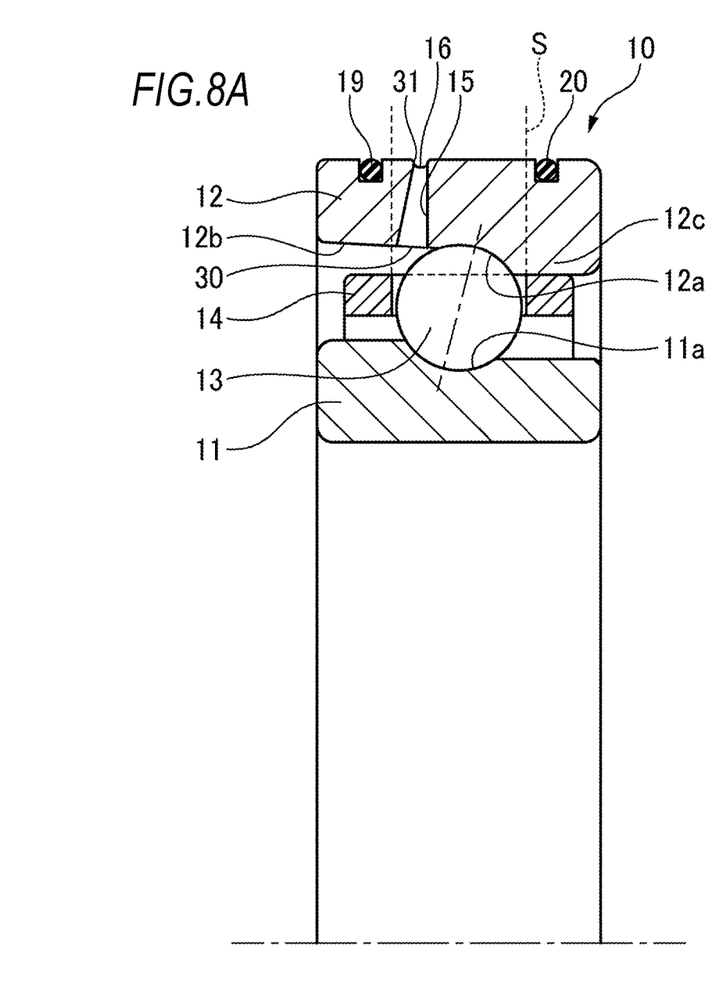
FIG. 8A is a sectional view of a ball bearing according to a fourth modification of the present embodiment.
Figure 8B:
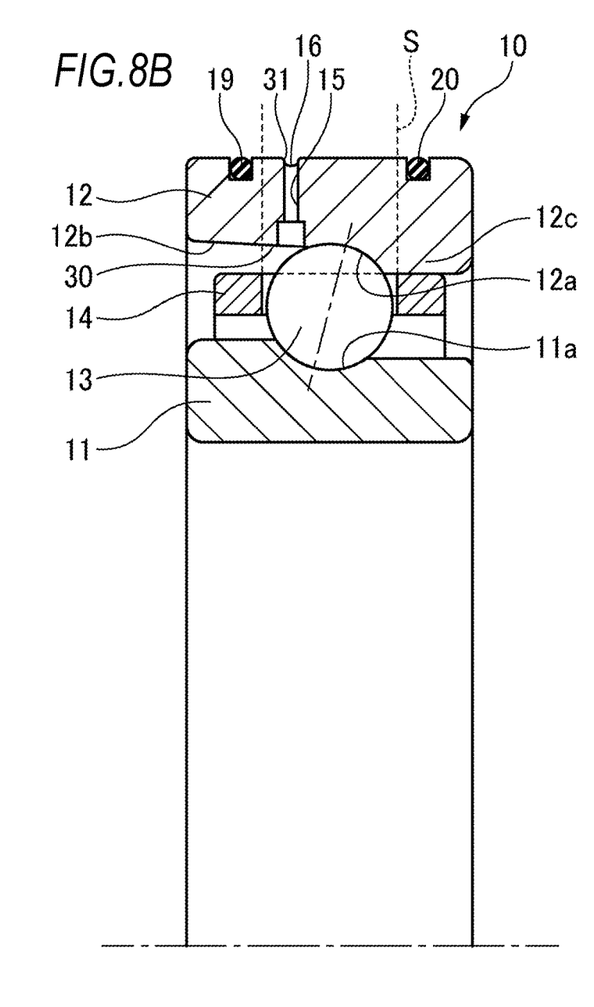
FIG. 8B is a sectional view of a ball bearing according to a fifth modification of the present embodiment.

As in fourth and fifth modifications illustrated in FIGS. 8A and 8B, the radial hole 15 may be formed such that the opening area of the inner diameter side opening portion 30 is wider than the opening area of an outer diameter side opening portion 31. In the fourth modification, the diameter of the radial hole 15 is enlarged such that the area is gradually enlarged from the outer diameter side opening portion 31 to the inner diameter side opening portion 30. In the fifth modification, the radial hole 15 is formed in a stepped shape such that the opening area of the inner diameter side opening portion 30 is larger than the opening area of the outer diameter side opening portion 31. That is, in the outer ring oil-supply type rolling bearing, the lubricating oil is directly supplied to the ball 13 through the radial hole 15. Thus, although the supply air pressure is lowered near the inner diameter side opening portion 30, the lubricating oil can be supplied to the ball 13. For this reason, by lowering the air pressure of the inner diameter side opening portion 30, collision of the high-pressure air against the ball 13 can be prevented, and noise during rotation of the bearing can be reduced.

In the second to fifth modifications illustrated in FIGS. 6 to 8B, the seal member 20 is arranged in the outer circumferential surface of the outer ring 12. However, similarly to FIG. 1, the seal member may not be provided.

The invention is not limited to the above-described embodiments and may be modified or improved appropriately.

Oil-mist lubrication may be adopted in addition to the oil-air lubrication as a method of supplying the lubricating oil into the radial hole of the outer ring. In some cases, oil jet lubrication may be adopted. However, in a grease supplying method of supplying grease from the radial hole 15 of the outer ring 12 by using the lubricant supplying device around the bearing or outside the spindle, when the radial hole 15 is formed to be open in the outer ring raceway groove 12a, the grease which is a semisolid containing a thickener is supplied into the outer ring raceway groove 12a.

In this case, since the grease is bitten into the outer ring raceway groove 12a, stirring resistance causes problems such as increase of torque and abnormal heat generation. Particularly, these problems easily occur in high-speed rotation as in the present embodiment. Therefore, an oil lubricating method of supplying the lubricating oil not containing the thickener is desirable in the invention.

The ball bearing of the invention is not limited to those applied to the spindle device for the machine tool and may be applied as a ball bearing of a general industrial machine or a high-speed rotating device such as a motor.

This application is based on Japanese Patent Application No. 2016-153245 filed on Aug. 3, 2016, the contents of which are incorporated herein by reference.

DESCRIPTION OF REFERENCE NUMERALS

10: angular ball bearing (ball bearing)
11: inner ring
11a inner ring raceway groove
12: outer ring
12a: outer ring raceway groove
12b: counter bore
12c: groove shoulder
13 ball
14: retainer
15, 15a, 15b: radial hole
16: concave groove
E: contact ellipse

The invention claimed is:

1. A ball bearing comprising:
   an inner ring with an inner ring raceway groove on an outer circumferential surface;
   an outer ring with an outer ring raceway groove on an inner circumferential surface;
   a plurality of balls which are arranged in a rollable manner between the inner ring raceway groove and the outer ring raceway groove; and
   a retainer with a plurality of pockets for retaining the plurality of respective balls, wherein:
   the outer ring includes a plurality of radial holes which penetrate from the outer circumferential surface of the outer ring to the inner circumferential surface of the outer ring in the radial direction to supply lubricating oil, such that the ball bearing is lubricated by the lubricating oil;
   when inner diameter side opening portions of the plurality of radial holes are projected on an outer circumferential surface of the retainer along extension lines of central lines of the radial holes, at least parts of the projected inner diameter side opening portions are positioned, in the circumferential surface area of the pockets, within an area of two circles formed by connecting each of axial end portions of respective pockets of the retainer in a rotational axial direction of the ball bearing; and
   when the central line of any one radial hole among the plurality of radial holes coincides with a circumferential phase of a center of the ball, any other radial hole is formed such that when the inner diameter side opening portion of the radial hole is projected on the outer circumferential surface of the retainer along the extension line of the central line of the radial hole, at least parts of the projected inner diameter side opening portion overlap with an inner circumferential surface of the pockets when viewed from a radial direction of the ball bearing, and the central line of the other radial hole is separated from the circumferential phase of the center of the ball.

2. The ball bearing according to claim 1, wherein
   a concave groove communicating with the radial hole is formed along a circumferential direction in an outer circumferential surface of the outer ring.

3. The ball bearing according to claim 2, wherein
   in the outer circumferential surface of the outer ring, annular grooves are formed on both axial sides sandwiching the concave groove along the circumferential direction, and annular seal members are respectively arranged in each of the annular grooves.

4. A spindle device for a machine tool comprising:
   the ball bearing according to claim 3.

5. A spindle device for a machine tool comprising:
   the ball bearing according to claim 2.

6. The ball bearing according to claim 1, wherein
   a diameter of the radial hole is 0.5 to 1.5 mm.

7. A spindle device for a machine tool comprising:
   the ball bearing according to claim 6.

8. The ball bearing according to claim 1, wherein in the radial hole, an opening area of the inner diameter side opening portion is larger than an opening area of the outer diameter side opening portion.

9. A spindle device for a machine tool comprising:
   the ball bearing according to claim 8.

10. A spindle device for a machine tool comprising:
    the ball bearing according to claim 1.

* * * * *